United States Patent Office 3,260,758
Patented July 12, 1966

3,260,758
METHOD OF MAKING CERTAIN DIALKYL-HYDROXYBENZYL ALKYL SULFIDES
Francis X. O'Shea, Wolcott, and Frank B. Root, Waterbury, Conn., assignors to United States Rubber Company, New York, N.Y., a corporation of New Jersey
No Drawing. Filed Aug. 1, 1963, Ser. No. 299,183
7 Claims. (Cl. 260—609)

This invention is concerned with a novel method for preparing compounds of the type:

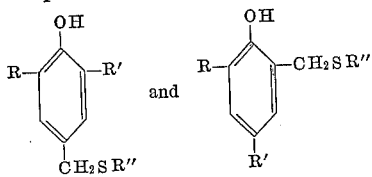

and in which R and R' are alkyl, cycloalkyl or aralkyl groups of up to 12 carbon atoms each and R'' is an alkyl, hydroxyalkyl, cycloalkyl, aryl or aralkyl group of up to 18 carbon atoms. This method involves the reaction of one molar equivalent of a compound of the general formula:

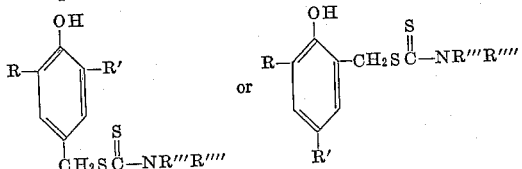

or in which R and R' are as previously defined and R''' and R'''' are lower alkyl groups with one molar equivalent of an alkali metal hydroxide and at least one molar equivalent of a mercaptan.

In U.S. Patents 2,322,376 (June 22, 1943) and 2,417,118 (Mar. 11, 1947), R. F. McCleary and S. M. Roberts disclosed as new compounds useful as lubricating oil additives compounds of the type:

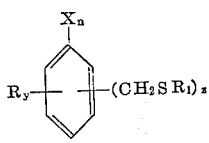

wherein R is a radical selected from the group consisting of hydrogen and a hydrocarbon radical, $R_1$ is a hydrocarbon radical, X is a substituent selected from the group consisting of hydroxyl radicals and metal substituted hydroxyl radicals and n, y and z are integers of at least one. The methods used to prepare these compounds were (a) the reaction of a phenolic compound with formaldehyde and an alkyl mercaptan and (b) the reaction of a phenolic Mannich base with a mercaptan.

This invention differs from the prior art in the following ways:

(1) The method herein described is novel. It has not been previously described.

(2) The method mentioned by McCleary and Roberts of a direct reaction between a phenol, formaldehyde and a mercaptan is operable on 2,6-dialkylphenols only with an alkaline catalyst. However, it tends to give colored products and, especially with the less hindered 2,6-dialkyl-phenols, is complicated by a side reaction leading to a methylene bis-phenol. On 2,4-dialkylphenols, the reaction gives poor yields, also being complicated by a side reaction leading to the methylene bis-phenol.

The method mentioned by McCleary and Roberts of a reaction between a phenolic Mannich base and the mercaptan requires long reaction periods (a 35-hour reflux is mentioned in one example).

Our method, on the other hand, works well with both highly hindered and less hindered 2,4- and 2,6-dialkyl-phenols, gives very good color of products and is rapid and complete. Side reactions are negligible.

In accordance with the invention, 2-hydroxy-3,5-dialkylbenzyl alkyl sulfides and 3,5-dialkyl-4-hydroxybenzyl alkyl sulfides are prepared by treating one molar equivalent of a compound of the general formula:

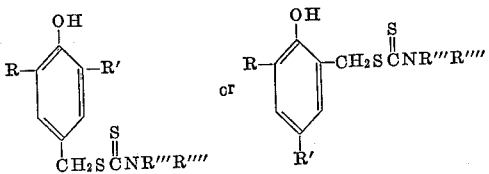

or in which R and R' are alkyl, cycloalkyl or aralkyl groups of up to 12 carbon atoms each and R''' and R'''' are lower alkyl radicals (e.g., 1 to 5 carbon atoms) with one molar equivalent of an alkali metal (e.g. sodium or potassium) hydroxide and at least one molar equivalent of a mercaptan of the general formula:

R''SH in which R'' is an alkyl, hydroxyalkyl, aryl, cycloalkyl or aralkyl group of up to 18 carbon atoms.

The equations for these reactions are therefore:

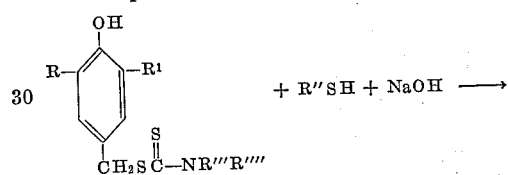

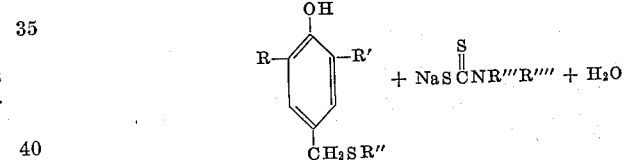

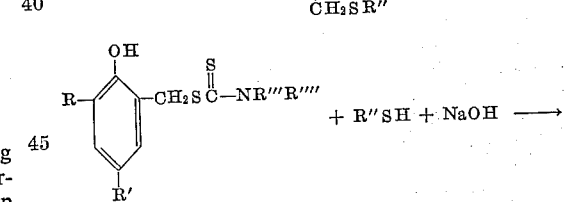

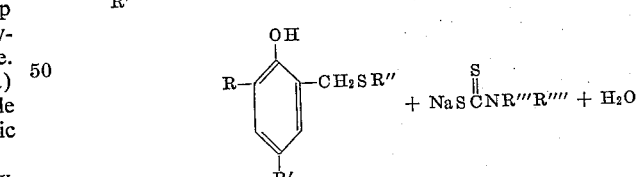

These two reactions may be represented generically by the equation:

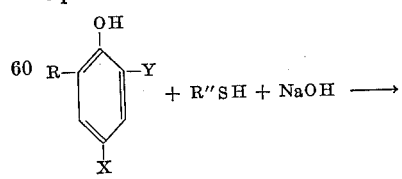

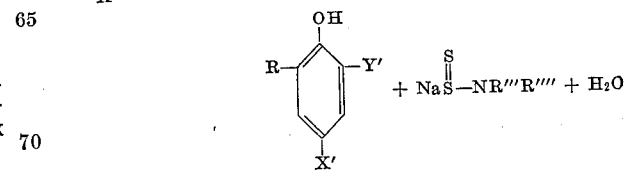

X and Y being selected from the group consisting of

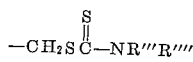

and R′, X being

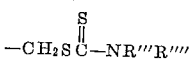

when Y is R′ and vice versa

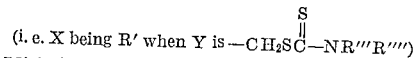

X′ and Y′ being correspondingly selected from the group consisting of —CH₂SR″ and R′ (i.e., X′ being —CH₂SR″ when X is

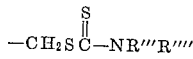

[in which case Y′ is of course R′] and X′ being R′ when X is R′ [in which case Y′ is of course —CH₂SR″]).

The reaction is generally carried out in an inert liquid medium, usually a suitable water miscible solvent such as methanol, ethanol, isopropanol, dioxane, ethylene glycol dimethyl ether, etc. at a temperature from about room temperature (e.g. 20° C.) to about 100° C. Ordinarily the reaction is carried out at the reflux temperature of the solution. The reaction may also be carried out in a two-phase system such as benzene-water, xylene-water, etc. using good agitation.

The intermediate 2,6-dialkyl-4-(dithiocarbamylmethyl) phenol or 2,4-dialkyl-6-(dithiocarbamylmethyl)phenol may be prepared by the reaction of the appropriate dialkylphenol with formaldehyde, a dialkylamine and carbon disulfide in a manner similar to that described by A. F. Hardman in U.S. Patent 2,757,174 (July 31, 1956).

The phenols which may be used include
2,6-xylenol,
2-methyl-6-t-butylphenol,
2,6-diisopropylphenol,
2,6-di-t-butylphenol,
2-methyl-6-cyclohexylphenol,
2-methyl-6-t-octylphenol,
2-methyl-6-(alpha-methylbenzyl)phenol,
2-methyl-6-(alpha,alpha-dimethylbenzyl)phenol, etc.,
2,4-dimethylphenol,
2-methyl-4-t-butylphenol,
2-t-butyl-4-methylphenol,
2,4-di-t-butylphenol,
2-methyl-4-cyclohexylphenol,
2-cyclohexyl-4-methylphenol,
2,4-dicyclohexylphenol,
2-methyl-4-t-octylphenol,
2-t-octyl-4-methylphenol,
2,4-di-t-octylphenol,
2-nonyl-4-methylphenol,
2-methyl-4-nonylphenol,
2,4-dinonylphenol,
2-methyl-4-(alpha-methylbenzyl)phenol,
2-(alpha-methylbenzyl)-4-methylphenol,
2,4-di(alphamethylbenzyl)phenol,
2-methyl-4-(alpha,alpha-dimethylbenzyl)phenol,
2-(alpha,alpha-dimethylbenzyl)-4-methylphenol,
2,4-di(alpha,alpha-dimethylbenzyl)phenol, etc.

Any dialkylamine may be used but the low molecular weight members are preferable. Examples are dimethyl amine, diethylamine, diisopropyl amine, dibutyl amine, and diamyl amine.

The mercaptans which may be used include the full range of 1°, 2° and 3° mercaptans from methyl mercaptan to t-dodecyl mercaptan, cycloalkyl mercaptans such as cyclohexyl mercaptan and terpene mercaptans, aryl mercaptans such as thiophenol and substituted thiophenols, aralkyl mercaptans such as benzyl mercaptan and substituted alkyl mercaptans such as mercaptoethanol, mercaptoethylamine, mercaptoethylurea, etc.

One preferred form of the invention contemplates the preparation of a 2,6-dialkyl-4-(hydroxyalkylthiomethyl) phenol from a 3,5-dialkyl-4-hydroxybenzyl N,N-dialkyldithiocarbamate and a mercaptoalkanol (the alkyl groups having, for example, 1 to 12 carbon atoms).

Another preferred form of the invention involves the preparation of a 2,6-dialkyl-4-(arylthiomethyl)phenol from a 3,5-dialkyl-4-hydroxybenzyl N,N-dialkyldithiocarbamate and an aryl mercaptan (the alkyl and aryl groups having (for example, 1 to 12 carbon atoms).

Still another preferred form of the invention is concerned with the preparation of a 2,4-dialkyl-6-(arylthiomethyl)phenol from a 2-hydroxy-3,5-dialkylbenzyl N,N-dialkyldithiocarbamate and an aryl mercaptan (the alkyl and aryl groups having, for example, 1 to 12 carbon atoms).

EXAMPLE #1

*Preparation of 2,6-di-t-butyl-4-(beta-hydroxyethylthiomethyl)phenol*

3,5-di-t-butyl-4-hydroxybenzyl N,N-dimethyldithiocarbamate is first prepared as follows:

2,6-di-t-butylphenol (103 g., 0.5 mole), 37% aqueous formaldehyde (40.5 g., 0.5 mole), 25% aqueous dimethylamine (90 g., 0.5 mole), carbon disulfide (40 g., 0.52 mole) and 400 ml. of ethanol were combined in a one-liter, 3-neck flask and heated slowly during 1½ hours to reflux with stirring. The solution was then refluxed for an additional 1½ hours, a precipitate beginning to separate after 30 minutes. The mixture was then cooled and the product was filtered off, washed with ethanol, and dried. The yield of 3,5-di-t-butyl-4-hydroxybenzyl N,N-dimethyldithiocarbamate was 152 g. (90%), M.P. 141–142° C.

A mixture of 33.9 g. (0.1 mole) of 3,5-di-t-butyl-4-hydroxybenzyl N,N-dimethyldithiocarbamate, 7 g. (0.1 mole) of 85% KOH (in 10 ml. of water) and 8 g. (0.1 mole) of beta-mercaptoethanol (R″SH where R is HOCH₂CH₂—)

in 100 ml. of ethanol was heated on the steam bath at reflux temperature until solution was complete (about ten minutes). The solution was then allowed to stand and cool for 30 minutes. It was then poured into 300 ml. of water and the product which separated was extracted with hexane-ether, dried with anhyd. K₂CO₃ and evaporated to a liquid residue which crystallized, wt.=30 g. (97%), M.P. 55–58°. The M.P. after one recrystallization from hexane was 58–59°.

*Analysis.*—Calc'd: Percent S, 10.80. Found: Percent S, 10.48.

EXAMPLE #2

*Preparation of 2-methyl-4-(p-t-butylphenylthiomethyl)-6-butylphenol*

3-methyl-4-hydroxy-5-t-butylbenzyl N,N-dimethyldithiocarbamate was first prepared as follows:

2-methyl-6-t-butylphenol (164 g., 1 mole), 37% aqueous formaldehyde (81 g., 1 mole), 25% aqueous dimethylamine (180 g., 1 mole), carbon disulfide (80 g., 1.05 mole) and 450 ml. of ethanol were combined in a 2-liter 3-neck flask and heated under reflux with stirring for 3 hours. The product separated as an oil which crystallized when the mixture was cooled. The mixture was filtered and the product was washed with ethanol and dried. The yield of 3-methyl-4-hydroxy-5-t-butylbenzyl N,N-dimethyldithiocarbamate was 251 g. (85%), M.P. 103–105° C.

A mixture of 29.7 g. (0.1 mole) of 3-methyl-4-hydroxy-5-t-butylbenzyl N,N-dimethyldithiocarbamate, 7 g. (0.1 mole) of 85% KOH (in 10 ml. of water) and 16.6 g. (0.1 mole) of p-t-butylthiophenol in 100 ml. of ethanol was heated to near reflux for 10 minutes. The solution was then allowed to cool. It was poured into water and the product was extracted with hexane-ether. The extract was dried with anhyd. $K_2CO_3$ and evaporated to a liquid product which crystallized, wt.=33 g. (97%), M.P. 88–90° after recrystallization from hexane.

EXAMPLE #3

*The preparation of 2-t-butyl-4-methyl-6-(p-t-butylphenylthiomethyl)phenol*

2-hydroxy-3-t-butyl-5-methylbenzyl N,N-dimethyldithiocarbamate was first prepared in the following manner:

A solution of 328 g. (2 moles) of 2-t-butyl-p-cresol, 178 g. (2.2 moles) of 37% aqueous formaldehyde and 396 g. (2.2 moles) of 25% aqueous dimethylamine in 900 ml. of methanol was heated slowly during two hours to reflux and then was refluxed for one hour. The product separated as an oil which crystallized when the reaction mixture was cooled with stirring. The crystalline product was filtered off, washed with aqueous methanol and dried. The weight of 2-t-butyl-4-methyl-6-dimethylaminomethyl phenol formed was 398 g. (90%), M.P. 49–51° C.

A portion of the Mannich base weighing 22 g. (0.1 mole) and 8 g. (0.1 mole) of carbon disulfide were dissolved in 40 ml. of ethylene glycol monoethyl ether and heated at reflux for 20 hours. The pot temperature rose from 97° to 118° during this time. The solution was cooled and the product precipitated by dilution of the solution with water. It was filtered off and dried yielding 16 g. (55%) of 2-hydroxy-3-t-butyl-5-methylbenzyl N,N-dimethyldithiocarbamate, M.P. 97–98° C.

To a solution of 3.3 g. (0.02 mole) p-t-butylthiophenol and 1.6 g. (0.02 mole) 50% sodium hydroxide in 25 ml. of ethanol was added 5.9 g. (0.02 mole) of 2-hydroxy-3-t-butyl-5-methylbenzyl N,N-dimethyldithiocarbamate. The solution was heated at reflux for 30 minutes and then poured into cold water. The product was extracted with ether and the ether extract was washed with water, dried over anhydrous sodium sulfate and evaporated down to a liquid residue which slowly crystallized. The yield of 2-t-butyl-4-methyl-6-(p-t-butylphenylthiomethyl)phenol was 6 g. (88%), M.P. 49–50° after recrystallization from hexane.

In a similar manner, the following chemicals, for example, may be prepared:

2,6-dimethyl-4-(methylthiomethyl)phenol
2,6-diisopropyl-4-(dodecylthiomethyl)phenol
2,6-di-t-butyl-4-(cyclohexylthiomethyl)phenol
2-methyl-4-(dodecylthiomethyl)-6-(alpha-methylbenzyl)phenol
2-methyl-4-(beta-hydroxyethylthiomethyl)-6-(alpha-methylbenzyl)phenol
2-methyl-4-(cyclohexylthiomethyl)-6-(alpha-methylbenzyl)phenol
2,6-di-(alpha-methylbenzyl)-4-(phenylthiomethyl)phenol
2-methyl-4-(ethylthiomethyl)-6-cyclohexylphenol
2,6-dicyclohexyl-4-(phenylthiomethyl)phenol
2,6-di-t-butyl-4-(benzylthiomethyl)phenol
2-methyl-4-(benzylthiomethyl)-6-(alpha-methylbenzyl)phenol
2,4-dimethyl-6-(methylthiomethyl)phenol
2,4-dimethyl-6-(dodecylthiomethyl)phenol
2,4-di-t-butyl-6-(cyclohexylthiomethyl)phenol
2-(dodecylthiomethyl)-4-methyl-6-(alpha-methylbenzyl)phenol
2-(beta-hydroxyethylthiomethyl)-4-methyl-6-(alpha,alpha-dimethylbenzyl)phenol
2-(cyclohexylthiomethyl)-4-methyl-6-(alpha,alpha-dimethylbenzyl)phenol
2-(phenylthiomethyl)-4,6-di-(alpha-methylbenzyl)phenol
2-(ethylthiomethyl)-4-methyl-6-cyclohexylphenol
2,4-di-t-butyl-6-(benzylthiomethyl)phenol The chemicals prepared by the present method are useful as antioxidants especially for rubbers (e.g. butadiene-styrene copolymers, polyisoprene, polybutadiene, ethylene-propylene copolymer, ethylene-propylene-dicyclopentadiene copolymer, and ethylene-propylene-hexadiene copolymer). They are also useful for other purposes, including synthesis of other chemicals.

Having thus described our invention, what we claim and desire to protect by Letters Patent is:

1. A method of preparing a compound selected from the group of those of the formulas:

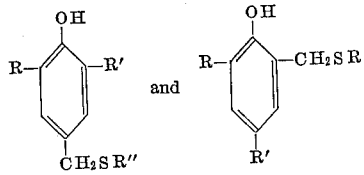

in which R and R' are selected from the group consisting of alkyl, cycloalkyl and aralkyl groups of up to 12 carbon atoms each and R" is selected from the group consisting of alkyl, hydroxyalkyl, aryl, cycloalkyl and aralkyl groups of up to 18 carbon atoms, comprising heating one molar equivalent of a compound selected from the group consisting of those of the general formulas:

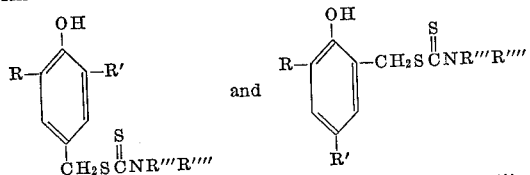

in which R and R' are as previously defined and R''' and R'''' are lower alkyl radicals in admixture with one molar equivalent of an alkali metal hydroxide and at least one molar equivalent of a mercaptan of the general formula:

R"SH in which R" is as previously defined, at a temperature from room temperature to 100° C.

2. A method of preparing a 2,6-dialkyl-4-(hydroxyalkylthiomethyl)phenol comprising heating, at a temperature from room temperature to 100° C., one molar equivalent of a 3,5-dialkyl-4-hydroxybenzyl N,N-dialkyldithiocarbamate, one molar equivalent of an alkali metal hydroxide and at least one molar equivalent of a mercaptoalkanol having up to 18 carbon atoms.

3. A method of preparing 2,6-di-t-butyl-4-(beta-hydroxyethylthiomethyl)-phenol comprising heating at reflux temperature one molar equivalent of 3,5-di-t-butyl-4-hydroxybenzyl N,N-dimethyldithiocarbamate, one molar equivalent of potassium hydroxide and one molar equivalent of beta-mercaptoethanol in ethanol, and thereafter separating 2,6-di-t-butyl-4-(beta-hydroxyethylthiomethyl)-phenol from the reaction mixture.

4. A method of preparing a 2,6-dialkyl-4-(arylthiomethyl)phenol comprising heating, at a temperature from room temperature to 100° C., one molar equivalent of a 3,5-dialkyl-4-hydroxybenzyl N,N-dialkyldithiocarbamate, one molar equivalent of an alkali metal hydroxide and at least one molar equivalent of an aryl mercaptan having up to 18 carbon atoms.

5. A method of preparing 2-methyl-4-(p-t-butylphenylthiomethyl)-6-t-butylphenol comprising refluxing one molar equivalent of 3-methyl-4-hydroxy-5-t-butylbenzyl N,N-dimethyldithiocarbamate, one molar equivalent of potassium hydroxide and one molar equivalent of p-t-butylthiophenol in ethanol, and thereafter separating 2-methyl-4-(p-t-butylphenylthiomethyl)-6-t-butylphenol from the reaction mixture.

6. A method of preparing a 2,4-dialkyl-6-(arylthiomethyl)phenol comprising heating, at a temperature from room temperature to 100° C., one molar equivalent of a 2-hydroxy-3,5-dialkylbenzyl N,N-dialkyldithiocarbamate, one molar equivalent of an alkali metal hydroxide and at least one molar equivalent of an aryl mercaptan having up to 18 carbon atoms.

7. A method of preparing 2-t-butyl-4-methyl-6-(p-t-butylphenylthiomethyl)phenol comprising refluxing one molar equivalent of 2-hydroxy-3-t-butyl-5-methylbenzyl N,N-dimethyldithiocarbamate, one molar equivalent of sodium hydroxide and one molar equivalent of p-t-butylthiophenol in ethanol, and thereafter separating 2-t-butyl-4-methyl-6-(p-t-butylphenylthiomethyl)phenol from the reaction mixture.

No references cited.

CHARLES B. PARKER, Primary Examiner.
DELBERT R. PHILLIPS, Assistant Examiner.